(12) United States Patent
Ruan et al.

(10) Patent No.: US 9,883,216 B2
(45) Date of Patent: Jan. 30, 2018

(54) METHOD AND APPARATUS FOR CARRYING TRANSPORT STREAM

(75) Inventors: Yaping Ruan, Shenzhen (CN); Jiazhou Li, Shenzhen (CN); Jian Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1136 days.

(21) Appl. No.: 13/319,829

(22) PCT Filed: May 10, 2010

(86) PCT No.: PCT/CN2010/072571
§ 371 (c)(1),
(2), (4) Date: Nov. 10, 2011

(87) PCT Pub. No.: WO2010/130188
PCT Pub. Date: Nov. 18, 2010

(65) Prior Publication Data
US 2012/0059950 A1    Mar. 8, 2012

(30) Foreign Application Priority Data

May 13, 2009   (CN) .......................... 2009 1 0107319

(51) Int. Cl.
*H04N 21/845*   (2011.01)
*H04N 21/8547*  (2011.01)
(Continued)

(52) U.S. Cl.
CPC ..... *H04N 21/23608* (2013.01); *H04N 21/242* (2013.01); *H04N 21/8456* (2013.01); *H04N 21/8547* (2013.01); *H04N 21/85406* (2013.01)

(58) Field of Classification Search
CPC ....... H04N 21/23608; H04N 21/85406; H04N 21/8547; H04N 21/242; H04N 21/8456; H04L 12/56
See application file for complete search history.

(56) References Cited

U.S. PATENT DOCUMENTS 6,111,896 A    8/2000 Slattery et al.
6,771,657 B1   8/2004 Elstermann
(Continued)

FOREIGN PATENT DOCUMENTS

CN    1551215 A    12/2004
CN    1561111 A    1/2005
(Continued)

OTHER PUBLICATIONS

International Search Report for PCT/CN2010/072571 dated Jul. 22, 2010.

*Primary Examiner* — Larry Donaghue
(74) *Attorney, Agent, or Firm* — Ling Wu; Stephen Yang; Ling and Yang Intellectual Property (57) ABSTRACT

The present invention discloses a method and an apparatus for bearing a Transport Stream (TS). The method includes: extracting TS packets continuously from the TS to constitute one or more sampling units, and obtaining index information of the sampling units; writing the sampling units into a data portion of a streaming media file, and generating an index portion of the streaming media file according to the index information. The present invention can encapsulate the TS into the streaming media files, so that the TS can be read by a standard streaming media file analyzing program, which facilitates multi-party interaction of the TS data in the streaming media field, and improves the practicability of the TS in the streaming media field.

14 Claims, 4 Drawing Sheets

(51) Int. Cl.
  *H04N 21/854* (2011.01)
  *H04N 21/236* (2011.01)
  *H04N 21/242* (2011.01)

(56) References Cited

U.S. PATENT DOCUMENTS

| | | | |
|---|---|---|---|
| 2002/0103920 A1* | 8/2002 | Berkun et al. | 709/231 |
| 2003/0177503 A1 | 9/2003 | Sull et al. | |
| 2004/0210948 A1* | 10/2004 | Jin et al. | 725/145 |
| 2005/0058431 A1* | 3/2005 | Jia | G06F 17/30843 386/230 |
| 2006/0051057 A1* | 3/2006 | Nakagawa | 386/69 |
| 2006/0257048 A1* | 11/2006 | Lin et al. | 382/276 |
| 2006/0285818 A1* | 12/2006 | Murabayashi | 386/46 |
| 2007/0150922 A1 | 6/2007 | Seo et al. | |
| 2007/0195892 A1* | 8/2007 | Choi | H04N 21/2383 375/240.26 |

FOREIGN PATENT DOCUMENTS

| | | |
|---|---|---|
| CN | 1666511 A | 9/2005 |
| CN | 1980390 A | 6/2007 |
| WO | 2013177870 A1 | 12/2013 |

* cited by examiner

METHOD AND APPARATUS FOR CARRYING TRANSPORT STREAM

TECHNICAL FIELD

The present invention relates to a method and an apparatus for bearing a Transport Stream (TS).

BACKGROUND OF THE RELATED ART

The MPEG Transport Stream (TS) defined in ISO 13818-1(ITU H.222) is a system layer multiplexing protocol that is widely used, it can bear various main audio and video encoding formats such as the MPEG1/2/4 video, the H264 video and the MPEG1/2/4 audio and the like, and is currently widely applied in the field of broadcasting and television. With the development of applications such as the interactive Internet Protocol Television (IPTV) and the like, the TS is also widely used in the field such as the streaming media based on an IP network and the like.

Since the TS lacks the random access capability, the time shift and storage of the program on demand of the TS in streaming media applications generally adopt private formats, i.e., adding index information such as a key frame to the TS and so on. However, use of a private format is not beneficial to multi-party interaction.

SUMMARY OF THE INVENTION

The technical problem to be solved in the present invention is to provide a method and an apparatus for bearing a TS to improve the practicability of the TS in the streaming media field.

In order to solve the above technical problem, the present invention provides a method for bearing a Transport Stream (TS), which comprises:

extracting TS packets continuously from the TS to constitute one or more sampling units, and obtaining index information of the sampling unit; and writing the sampling unit into a data portion of a streaming media file, and generating an index portion of the streaming media file according to the index information.

Preferably, in said step of extracting TS packets continuously from the TS to constitute one or more sampling units, the TS packets are constituted into the sampling unit according to one or more of the following rules:

(1) if a number of the TS packets that have been extracted reaches to a limit number N of TS packets, the TS packets that have been extracted constituting the sampling unit;

(2) if the TS packet that is extracted currently does not includes key frame video data, continuously extracting TS packets until a next TS packet including key frame video data, and the TS packets that have been extracted constituting the sampling unit;

(3) if the TS packet that is extracted currently does not includes key frame video data, continuously extracting TS packets until a next TS packet whose timestamp is different from that of the TS packet that is sampled currently, and the TS packets that have been extracted constituting the sampling unit;

(4) if the TS packet that is extracted currently includes key frame video data, continuously extracting TS packets until a next TS packet not including key frame video data, and the TS packets that have been extracted constituting the sampling unit.

Preferably, said step of obtaining the index information of the sampling unit comprises:

analyzing each TS packet in the sampling unit;

recording whether the each TS packet includes key frame video data; and obtaining a timestamp corresponding to the each TS packet through conversion according to a current program clock reference value of the sampling unit.

Preferably, said step of obtaining index information of the sampling unit further comprises:

if any one of the TS packets in the sampling unit includes key frame video data, then marking the sampling unit as a key frame; and the timestamp of the sampling unit being a timestamp of a first TS packet in the sampling unit.

Preferably, said streaming media file is one of following file formats: ISO, MP4, MOV, and 3GP.

In order to solve the above technical problem, the present invention provides an apparatus for bearing a Transport Stream (TS), which comprises:

a sampling module configured to: extract TS packets continuously from the TS to constitute one or more sampling units;

an obtaining module, which is configured to: obtain index information of the sampling unit obtained by the sampling module;

a data module, which is configured to: write the sampling unit obtained by the sampling module into a data portion of a streaming media file; and an index module, which is configured to: generate an index portion of the streaming media file according to the index information obtained by the obtaining module.

Preferably, the sampling module is configured to: constitute the sampling unit by the TS packets according to one or more of the following rules:

(1) if a number of the TS packets that have been extracted reaches to a limit number N of TS packets, the TS packets that have been extracted constituting the sampling unit;

(2) if the TS packet that is extracted currently does not includes key frame video data, continuously extracting TS packets until a next TS packet including key frame video data, and the TS packets that have been extracted constituting the sampling unit;

(3) if the TS packet that is extracted currently does not includes key frame video data, continuously extracting TS packets until a next TS packet whose timestamp is different from that of the TS packet that is sampled currently, and the TS packets that have been extracted constituting the sampling unit;

(4) if the TS packet that is extracted currently includes key frame video data, continuously extracting TS packets until a next TS packet not including key frame video data, and the TS packets that have been extracted constituting the sampling unit.

Preferably, the obtaining module comprises:

an analyzing sub-module, which is configured to: analyze each TS packet in the sampling unit obtained by the sampling module;

a key frame sub-module, which is configured to: record whether the each TS packet obtained by the analyzing sub-module includes key frame video data; and a timestamp sub-module, which is configured to: obtain a timestamp corresponding to the each TS packet obtained by the analyzing sub-module through conversion according to a current program clock reference value of the sampling unit.

Preferably, the obtaining module further comprises:

a result sub-module, which is configured to: mark the sampling unit obtained by the sampling module as a key frame if any one of the TS packets obtained by the key frame sub-module includes key frame video data; and, mark a timestamp of a first TS packet in the sampling unit obtained by said timestamp sub-module as the timestamp of the sampling unit obtained by the sampling module.

Preferably, the apparatus is integrated into a streaming media server or a mobile television terminal.

The method and apparatus for bearing the TS in the streaming media file provided in the present invention can encapsulate the TS into the streaming media files, so that the TS data can be read by a standard streaming media file analyzing program, which facilitates multi-party interaction of the TS data in the streaming media field, and improves the practicability of the TS in the streaming media field.

Furthermore, operation can be made on the TS according to the timestamp included in the encapsulated streaming media file based on the set time, thereby achieving the reading, fast forward, fast backward, and random play and the like of the TS, and further popularizing TS applications in the streaming media field.

PREFERRED EMBODIMENTS OF THE INVENTION

Since use of the private format is not beneficial to multi-party interaction, encapsulating a TS in a standard file format supporting the random access, for example an International Organization for Standardization (ISO) media file, becomes a problem demanding a prompt solution for applications of the TS in the fields such as the streaming media and the like.

The specific embodiments of the present invention will be described in detail with reference to the drawings.

The inventive concept of the present invention is to provide a method and an apparatus for encapsulating a TS in a streaming media file.

There is a plurality of following problems to be solved for encapsulating a TS in a streaming media file:

1. A TS itself multiplexes multiple paths of original streams, so how to sample the TS needs to be determined in order to map a TS packet to the streaming media file.

2. How to determine the timestamp of the sampling unit in the media file.

The so-called streaming media file in the present invention includes but not limited to standard streaming media files supporting the random access, such as the ISO, MP4, MOV or 3GP and the like, wherein the ISO media file format is a media file format widely used in the streaming media field, and MP4, MOV and 3GP file formats are all derived and extended therefrom. Due to the container feature of the ISO media file format, theoretically the ISO media file can bear video and audio data of various encoding formats. In the following examples, description will be made only by taking the ISO media file as an example, and other streaming files have the same principle.

Figure 1:
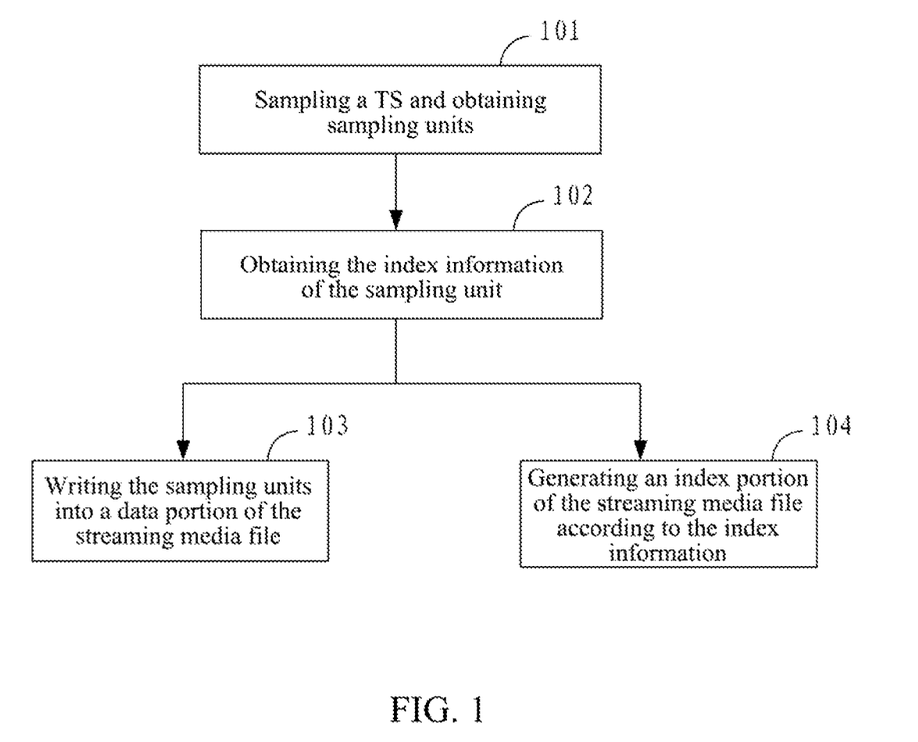
FIG. 1 illustrates the flow schematic diagram of the method for bearing the TS in a streaming media file according to an example of the present invention.

FIG. 1 illustrates the flow schematic diagram of the method for bearing the TS in a streaming media file according to an example of the present invention. With reference to FIG. 1, the method for bearing a TS in a streaming media file comprises:

101, a TS is sampled to obtain sampling units;

wherein the step of sampling a TS specifically comprises: continuously extracting TS packets from the TS until the number of extracted TS packets reaches a limit number N (N is an integer) of TS packets; or if the TS packet that is sampled currently does not includes key frame video data, TS packets are extracted continuously until a next TS packet including a key frame; or, if the TS packet that is sampled currently does not includes key frame video data, TS packets are continuously extracted until a next TS packet whose timestamp is different from that of the TS packet that is sampled currently; or, if the TS packet that is sampled currently includes key frame video data, TS packets are continuously extracted until a next TS packet not including key frame video data.

102, the index information of the sampling units is obtained.

The index information includes but not limited to the key frame and the timestamp, specifically:

analyzing each TS packet in the sampling unit;

recording whether the each TS packet includes key frame video data; and obtaining timestamps corresponding to the each TS packet through the conversion according to a current program clock reference (PCR) value of the sampling unit.

If any one of the TS packets in the sampling unit includes key frame video data, then the sampling unit is marked as a key frame.

The timestamp of the sampling unit is the timestamp of the first TS packet in the sampling unit.

103, the sampling units are written into a data portion of the streaming media file.

The data portion of the streaming media file is used to bear the data packets of the streaming media file, and for an ISO media file, the data portion refers to the mdat portion of the ISO media file. For different streaming media file formats, the data portion can adopt different fields for bearing.

104, an index portion of the streaming media file is generated according to the index information.

The index portion of the streaming media file is used to bear data indication information of the streaming media file and the like, and for an ISO media file, the index portion refers to the moov atom information portion of the ISO media file. For different streaming media file formats, the index portion can adopt different fields for bearing.

Step 103 may be executed before step 104; or step 104 may be executed before step 103; or step 103 and step 104 are executed simultaneously.

Figure 2:
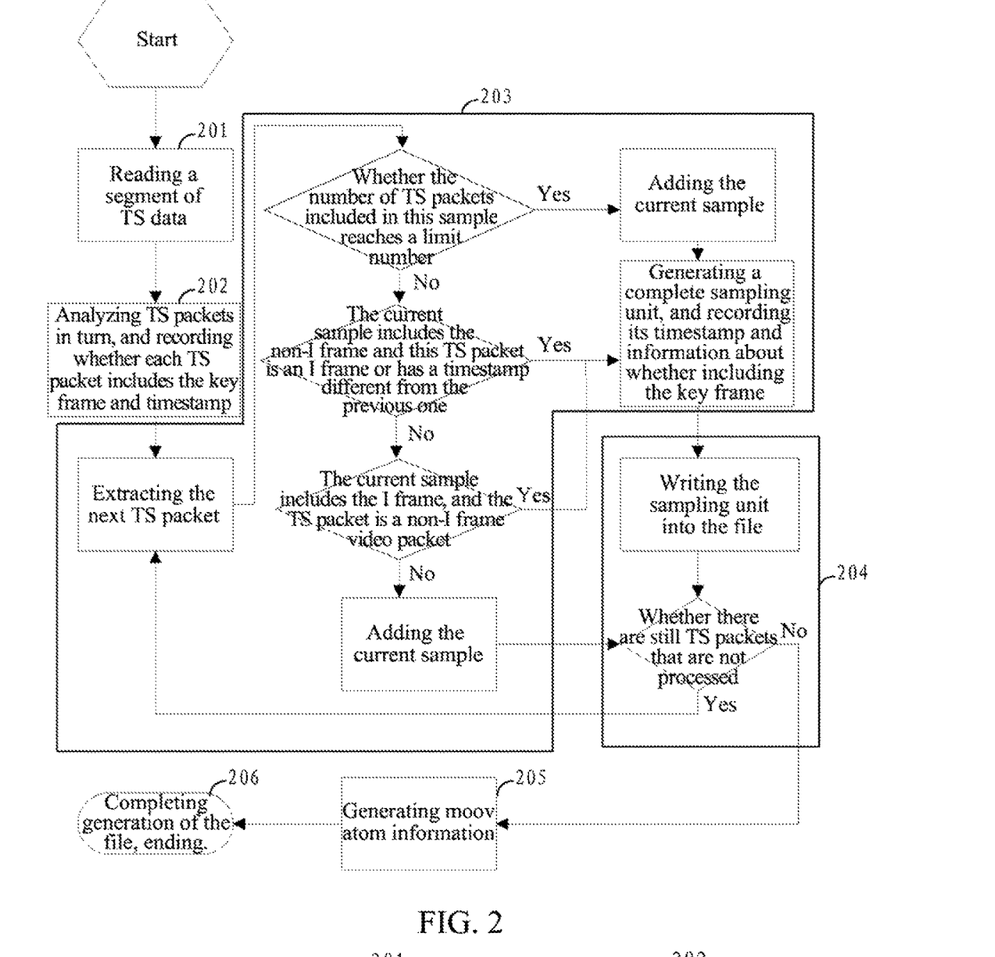
FIG. 2 illustrates the flow schematic diagram of the method for bearing the TS in an ISO streaming media file according to an application example of the present invention.

FIG. 2 illustrates the flow schematic diagram of the method for bearing the TS in an ISO streaming media file according to an application example of the present invention. With reference to FIG. 2, the method for bearing a TS in an ISO streaming media file comprises:

201, a segment of TS data is received and read.

202, TS packets are analyzed in turn, and information is recoded, which comprises:

whether each TS packet includes video key frame (I frame) data; and each TS packet corresponding to a timestamp, which is obtained through conversion according to the current PCR value in the TS.

203, an integer number of continuous TS packets is extracted according to a certain rule to constitute a sampling unit, and its timestamp is recorded. The rule for extracting packets is as follows:

continuously extracting TS packets until reaching a limit number N of the TS packets.

If the current sample does not includes I frame video data, TS packets are extracted continuously until the next I frame TS packet or until the next TS packet with a different timestamp.

If the current sample includes I frame TS packets, TS packets are extracted continuously until the next TS packet not including I frame video packet.

It can be judged that the sampling unit is completely collected as long as any one of the above conditions is satisfied. The timestamp corresponding to the sampling unit is determined by the timestamp of the first TS packet.

If any one of TS packets in the sampling unit is a key frame, then this sampling unit is marked as the key frame. The timestamp of the first TS packet thereinto is recorded as the timestamp corresponding to this sampling unit and whether a key frame is included.

204, the sampling unit is written into the mdat portion of the file according to the ISO media file format, and if there are still TS packets, step 203 is performed, otherwise, the next step of step 204 is performed.

205, moov atom information portion is generated according to the information recorded in step 203.

206, generation of the file is completed, end.

Figure 3:
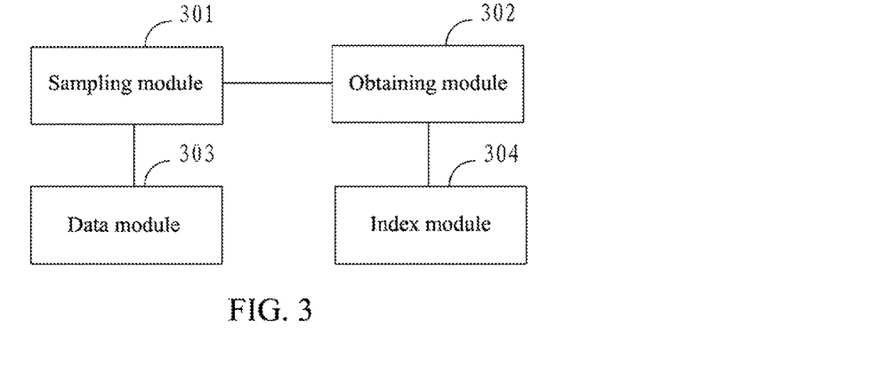
FIG. 3 illustrates the structure schematic diagram of the apparatus for bearing the TS in a streaming media file according to an example of the present invention.

FIG. 3 illustrates the structure schematic diagram of the apparatus for bearing the TS in a streaming media file according to an example of the present invention. The apparatus can be set separately, or can be integrated into a streaming media server or a mobile television terminal. With reference to FIG. 3, the apparatus comprises:

a sampling module 301, which is configured to: sample a TS to constitute one or more sampling units;

an obtaining module 302, which is configured to: obtain index information of the sampling unit obtained by the sampling module;

a data module 303, which is configured to: write the sampling unit obtained by the sampling module into a data portion of the streaming media file; and an index module 304, which is configured to: generate an index portion of the streaming media file according to the index information obtained by the obtaining module.

Furthermore, the sampling module may comprise:

a sampling sub-module, which is configured to: continuously extract TS packets from the TS;

a judging sub-module, which is configured to: constitute the sampling unit by the TS packets according to one or more of the following rules:

(1) if the number of the TS packets extracted by the sampling sub-module reaches a limit number N (N is an integer) of TS packets, constituting the sampling unit by the TS packets that have been extracted;

(2) if the TS packet that is extracted currently by the sampling sub-module does not includes key frame video data, continuously extracting TS packets until a next TS packet including a key frame, and constituting the sampling unit by the TS packets that have been extracted;

(3) if the TS packet that is extracted currently by the sampling sub-module does not includes key frame video data, continuously extracting TS packets until a next TS packet whose timestamp is different from that of the TS packet that is sampled currently, and constituting the sampling unit by the TS packets that have been extracted;

(4) if the TS packet that is extracted currently by the sampling sub-module includes key frame video data, continuously extracting TS packets until a next TS packet not including key frame video data, and constituting the sampling unit by the TS packets that have been extracted.

Furthermore, the obtaining module may comprise:

an analyzing sub-module, which is configured to: analyze each TS packet in the sampling unit obtained by the sampling module;

a key frame sub-module, which is configured to: record whether the each TS packet obtained by the analyzing sub-module includes key frame video data; and a timestamp sub-module, which is configured to: obtain a timestamp corresponding to the each TS packet obtained by the analyzing sub-module through conversion according to a current program clock reference value of the sampling unit.

Furthermore, the obtaining module may further comprise:

a result sub-module, which is configured to: mark the sampling unit obtained by the sampling module as a key frame if any one of the TS packets obtained by the key frame sub-module includes key frame video data; and, mark the timestamp of the first TS packet in the sampling unit obtained by the timestamp sub-module as the timestamp of the sampling unit obtained by the sampling module as.

The specific application of the method and apparatus for bearing a TS in a streaming media file provided by the present invention in the streaming media field will be described below.

Figure 4:
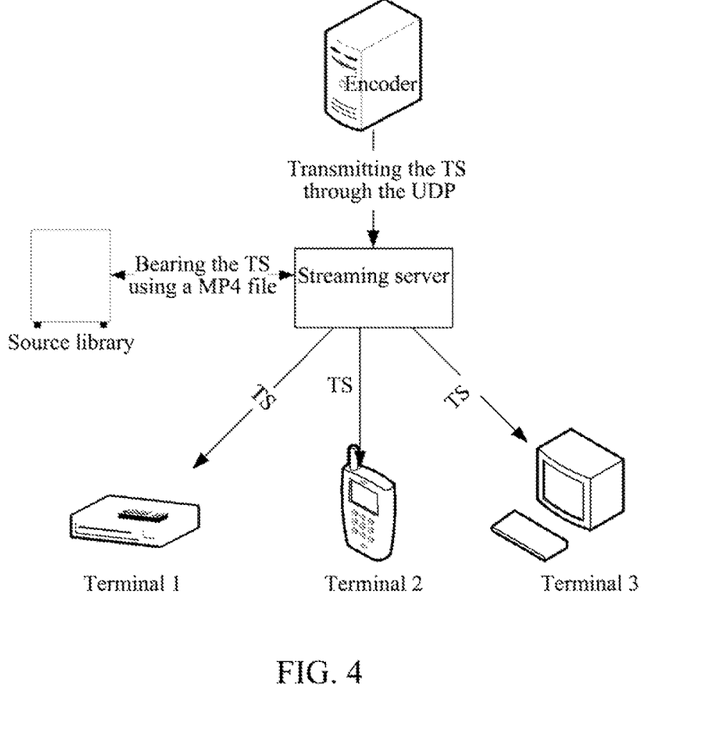
FIG. 4 illustrates the application scenario of the TS on live and on demand of streaming media according to an application example of the present invention.

FIG. 4 illustrates the application scenario of the TS on live and on demand of the streaming media. With reference to FIG. 4, the streaming server receives the TS live code stream sent by an encoder through the User Datagram Protocol (UDP), the TS live code stream is born using a MP4 file, and the generated MP4 file is pre-stored in the source library. When a user needs to order and play back this program subsequently, the streaming server reads the MP4 file through a standard MP4 reading program, executes fast forward and fast backward instructions sent by the user, and sends the corresponding TS data to the terminal.

Figure 5:
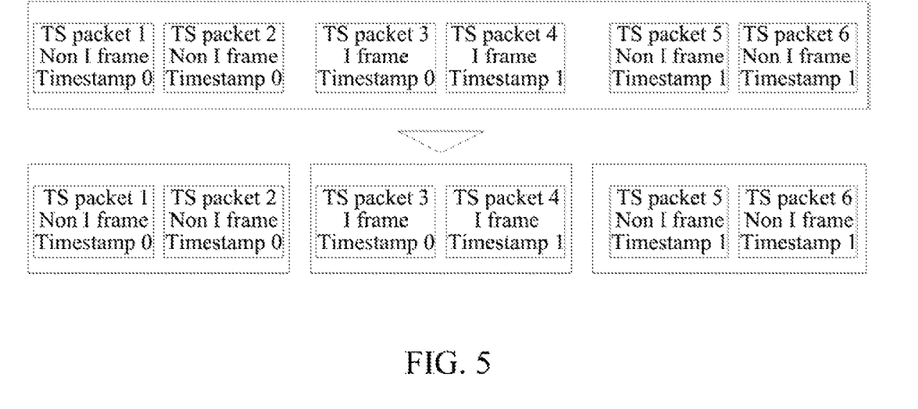
FIG. 5 illustrates the schematic diagram of regrouping samples of TS packets in FIG. 4.

FIG. 5 illustrates the schematic diagram of regrouping samples of TS packets in FIG. 4. With reference to FIG. 5:

1. TS data are read, including TS packet 1-packet 6;

2. I frame information and timestamp of each TS packet are analyzed and recorded, as follows:

a) TS1 and TS2 are both not I frames, and the timestamps are both 0;

b) TS3 and TS4 are both I frames, and the timestamps are 0 and 1 respectively;

c) TS5 and TS6 are both not I frames, and the timestamps are both 1.

3. The TS packets are grouped into sampling units:
   a) TS1 and TS2 constituting a sampling unit 1
   b) TS3 and TS4 constituting a sampling unit 2
   c) TS5 and TS6 constituting a sampling unit 3
4. The information of key frame and timestamp is recorded
   a) the timestamp of the sampling unit 1 is 0.
   b) the timestamp of the sampling unit 2 is 0, I frame.
   c) the timestamp of the sampling unit 3 is 1.
5. The sampling units are written into the file in turn.
6. The moov atom information is generated according to information of the timestamp and I frame.
7. Generation of a complete mp4 media file is completed.

Figure 6:
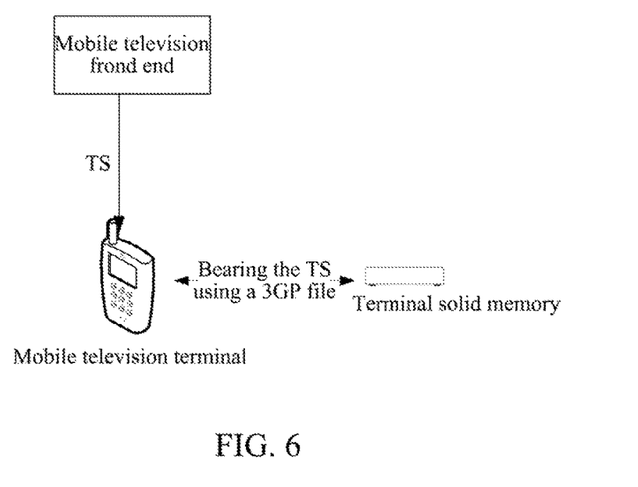
FIG. 6 illustrates a scenario of a mobile TV terminal implementing the TS local recording and playback according to an application example of the present invention.

FIG. 6 illustrates a scenario of the mobile television terminal implementing TS local recording (PVR) and playback. With reference to FIG. 6, the mobile television terminal receives the code stream sent by the front end, demodulates the TS data corresponding to the live, program, uses a 3GP file to bear the TS, and writes the generated 3GP file into the storage device. When a user needs to order and play back this program subsequently, a terminal play program reads the 3GP file through a standard 3GP reading program library, executes fast forward and fast backward instructions sent by the user, extracts the corresponding TS, and restores video and audio original data decoding to play through a standard TS de-multiplexing library.

Figure 7:
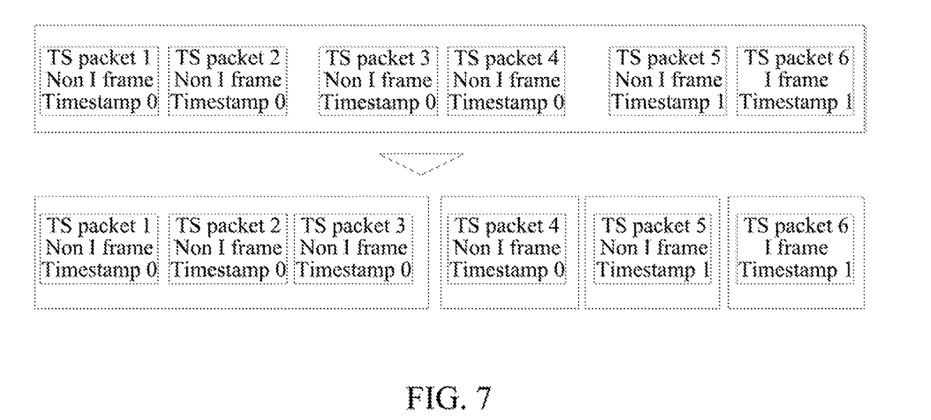
FIG. 7 illustrates the schematic diagram of regrouping samples of TS packets in FIG. 6.

FIG. 7 illustrates the schematic diagram of regrouping samples of TS packets in FIG. 6. With reference to FIG. 7 (suppose that the limit number of TS packets in each sampling unit is 3):

1. TS data is read, including TS packet 1-packet 6
2. I frame information and the timestamp of each TS packet are analyzed and recorded, as follows:
   a) TS1, TS2, TS3, and TS4 are all not I frames, and the timestamps are both 0.
   b) TS5 is not an I frame, and the timestamp is 1.
   c) TS6 is an I frame, and the timestamp is 1.
3. The TS packets are grouped into sampling units:
   a) TS1, TS2 and TS3 constituting a sampling unit 1
   b) TS4 constituting a sampling unit 2
   c) TS5 constituting a sampling unit 3
   d) TS6 constituting a sampling unit 4
4. Information of the key frame and timestamp is recorded
   a) the timestamp of the sampling unit 1 is 0.
   b) the timestamp of the sampling unit 2 is 0.
   c) the timestamp of the sampling unit 3 is 1.
   d) the timestamp of the sampling unit 4 is 1, I frame.
5. The sampling units are written into the file in turn
6. The moov atom information is generated according to the information of the timestamp and I frame.
7. Generation of a complete 3GP media file is completed.

The method and apparatus for bearing a TS in the streaming media file provided in the present invention can encapsulate the TS into the streaming media files, so that the TS data can be read by a standard streaming media file analyzing program, which facilitates multi-party interaction of the TS data in the streaming media field, and improves the practicability of the TS in the streaming media field.

Although the present invention is described with reference to specific examples, a person having ordinary skill in the art can make modifications and changes without departing from the spirit or scope of the present invention. Such modifications and changes shall be regarded as within the scope of the present invention and the scope of the attached claims.

INDUSTRIAL APPLICABILITY

The present invention provides a method and an apparatus for bearing a TS, the TS can be encapsulated into the streaming media files, so that the TS data can be read by a standard streaming media file analyzing program, which facilitates multi-party interaction of the TS data in the streaming media field, and improves the practicability of the TS in the streaming media field.

What is claimed is:

1. A method for bearing a Transport Stream (TS) in a streaming media file, comprising:
   reading a segment of TS data;
   analyzing key frame video data and timestamp of each TS packet in the segment of TS data;
   extracting TS packets continuously from the TS to constitute one or more sampling units, and obtaining index information of said one or more sampling units; and
   writing said one or more sampling units into a data portion of the streaming media file, and generating an index portion of the streaming media file according to said index information to bear the TS in the streaming media file;
   wherein, said step of extracting TS packets continuously from the TS to constitute one or more sampling units comprising:
   extracting next TS packet;
   constituting one or more sampling units with the extracted TS packets when a number of extracted TS packets reaches to a limit number N of TS packets that can be borne in a data portion of a streaming media file according to a format of the streaming media file and a size of a TS packet;
   when a number of extracted TS packets does not reach to a limit number of N of TS packets that can be borne in a data portion of a streaming media file according to a format of the streaming media file and a size of a TS packet:
   continuously extracting TS packets until a next TS packet whose timestamp is different from that of the TS packet that is sampled currently when a currently extracted TS packet includes non-key frame video data or continuously extracting TS packets until a next TS packet including key frame video data when a currently extracted TS packet includes non-key frame video data, and constituting one or more sampling units with the extracted TS packets;
   continuously extracting TS packets until a next TS packet including non-key frame video data when a currently extracted TS packet includes key frame video data, and constituting one or more sampling units with the extracted TS packets;
   determining whether there are still TS packets that are not processed, performing said step of extracting TS packets continuously from the TS to constitute one or more sampling units when there are still TS packets that not processed.

2. The method according to claim 1, wherein, said obtaining the index information of said one or more sampling units comprises:
   analyzing each TS packet in said one or more sampling units;
   recording whether said each TS packet includes key frame video data; and obtaining a timestamp corresponding to said each TS packet through conversion according to a current program clock reference value of said one or more sampling units.

3. The method according to claim 2, wherein, said obtaining index information of the one or more sampling units further comprises:

when any one of the TS packets in said one or more sampling units includes key frame video data, marking said one or more sampling units as a key frame; and the timestamp of said one or more sampling units being a timestamp of a first TS packet in said one or more sampling units.

4. The method according to claim 1, wherein, said streaming media file is one of following file formats: ISO, MP4, MOV, and 3GP.

5. The method according to claim 1, wherein, said streaming media file is one of following file formats: ISO, MP4, MOV, and 3GP.

6. The method according to claim 2, wherein, said streaming media file is one of following file formats: ISO, MP4, MOV, and 3GP.

7. The method according to claim 3, wherein, said streaming media file is one of following file formats: ISO, MP4, MOV, and 3GP.

8. An apparatus for bearing a Transport Stream (TS) in a streaming media file, comprising a processor and a storage device, wherein the storage device stores processor-executable program that comprises following modules:

a reading module, configured to read a segment of TS data;

an analyzing module, configured to analyze key frame video data and timestamp of each TS packet in the segment of TS data;

a sampling module, configured to extract TS packets continuously from the TS to constitute one or more sampling units;

an obtaining module, configured to obtain index information of the one or more sampling units obtained by said sampling module;

a data module, configured to write the one or more sampling units obtained by said sampling module into a data portion of the streaming media file; and an index module, configured to generate an index portion of the streaming media file according to the index information obtained by said obtaining module;

such that the TS can be borne on the streaming media file;

wherein said sampling module further comprising:

extracting next TS packet;

constituting one or more sampling units with the extracted TS packets when a number of extracted TS packets reaches to a limit number N of TS packets that can be borne in a data portion of a streaming media file according to a format of the streaming media file and a size of a TS packet;

when a number of extracted TS packets does not reach to a limit number of N of TS packets that can be borne in a data portion of a streaming media file according to a format of the streaming media file and a size of a TS packet:

continuously extracting TS packets until a next TS packet whose timestamp is different from that of the TS packet that is sampled currently when a currently extracted TS packet includes non-key frame video data or continuously extracting TS packets until a next TS packet including key frame video data when a currently extracted TS packet includes non-key frame video data, and constituting one or more sampling units with the extracted TS packets;

continuously extracting TS packets until a next TS packet including non-key frame video data when a currently extracted TS packet includes key frame video data, and constituting one or more sampling units with the extracted TS packets;

determining whether there are still TS packets that are not processed, performing said step of extracting TS packets continuously from the TS to constitute one or more sampling units when there are still TS packets that not processed.

9. The apparatus according to claim 8, wherein, said obtaining module comprises:

an analyzing sub-module, configured to analyze each TS packet in the one or more sampling units obtained by said sampling module;

a key frame sub-module, configured to record whether the each TS packet obtained by said analyzing sub-module includes key frame video data; and a timestamp sub-module, configured to obtain a timestamp corresponding to said each TS packet obtained by the analyzing sub-module through conversion according to a current program clock reference value of said one or more sampling units.

10. The apparatus according to claim 9, wherein, said obtaining module further comprises:

a result sub-module, configured to mark said one or more sampling units obtained by the sampling module as a key frame if any one of the TS packets obtained by said key frame sub-module includes key frame video data; and, mark a timestamp of a first TS packet in the one or more sampling units obtained by said timestamp sub-module as the timestamp of the one or more sampling units obtained by the sampling module.

11. The apparatus according to claim 8, wherein, the apparatus is integrated into a streaming media server or a mobile television terminal.

12. The apparatus according to claim 8, wherein, the apparatus is integrated into a streaming media server or a mobile television terminal.

13. The apparatus according to claim 9, wherein, the apparatus is integrated into a streaming media server or a mobile television terminal.

14. The apparatus according to claim 10, wherein, the apparatus is integrated into a streaming media server or a mobile television terminal.

* * * * *